Patented June 23, 1931

1,811,698

UNITED STATES PATENT OFFICE

BYRAMJI D. SAKLATWALLA, OF CRAFTON, PENNSYLVANIA, ASSIGNOR TO VANADIUM CORPORATION OF AMERICA, OF BRIDGEVILLE, PENNSYLVANIA, A CORPORATION OF DELAWARE

MANUFACTURE OF VANADIUM STEEL

No Drawing. Application filed December 20, 1928. Serial No. 327,480.

The present invention relates to the manufacture of vanadium steel, and especially to the production of vanadium steel from unreduced vanadium-containing raw materials by direct reduction of the vanadium content of such materials and incorporation into the steel during the process of steel making.

Vanadium steels hitherto manufactured ordinarily have been produced by the introduction of the vanadium content into the steel by the addition of a vanadium alloy, generally ferro-vanadium. This procedure entails a preliminary reduction of the vanadium-containing raw materials to the ferro-alloy. The production of such a preliminary ferro-alloy not only entails a high cost, but its addition to the steel bath introduces not only the vanadium content, but also the inert iron content and other impurities which are unavoidably present in the ferro-vanadium. Also, by the addition of vanadium in the form of a ferro-alloy, in solid lumps, to the contents of a steel ladle or furnace, the distribution and solution of the vanadium in the molten steel is not perfect, there being possibilities of a segregation of the vanadium content in the body of the steel. Further, vanadium being a readily oxidizable element at higher temperatures, part of it is oxidized in the air and part by interaction with the metallic oxides present in the slag or, in abnormal cases, even with the oxides dissolved in the molten steel itself, thus entailing a loss.

In accordance with my process, the reduction of the vanadium from unreduced vanadium-containing raw materials directly in the bath of molten steel during the process of steel making obviates the above mentioned difficulties. The preliminary cost of the reduction of ferrovanadium is obviated, the impurities and inert materials usually found in commercial ferrovanadium are eliminated, the possibility of segregation of the vanadium content is forestalled, and the loss through oxidation is avoided. Besides the above mentioned commercial and technical advantages obtained by the addition of vanadium from unreduced vanadium-containing raw materials by their reduction directly in the steel bath, certain very important metallurgical advantages are gained. The usual percentages of vanadium added to steel are very small, in structural steels being only from about .15% to .25%, and exceeding 1% only in the case of high speed tool steels. These slight percentages of vanadium impart to the various types of structural steels remarkably useful properties. Characteristic influences of small percentage of vanadium in steel are its effect on the grain size of the finished steel and its ability to inhibit grain growth in fabricated and worked material. This influence on grain size is ascribable to the capability of vanadium to deoxidize the structural constituents of steel, such for instance, as ferrite, at the moment of alloying with it, by what I term "molecular scavenging action". As this salutary action is exerted on the constituents of steel at their formation, this effect persists in the finished steel throughout the processes of working, fabricating and heat treating during the entire life of the steel. From the above it can be readily seen that the form and its corresponding degree of activity in which vanadium is introduced into the steel will have marked influence on the degree of molecular scavenging and consequent grain size of the steel to which it is added.

The reactivity of an alloy added to a bath of steel is dependent upon the percentage of the active element contained in the alloy. For instance, a ferrosilicon containing 90% silicon reacts more energetically and completely than one containing 50% silicon, which, in turn, reacts more quickly than one containing 15% silicon. Also, part of the active constituent of the alloy can exist in the form not of an alloy, but as compounds, such as silicides, carbides, etc., which do not react in the bath of steel with the same degree of efficacy. Vanadium, therefore, added in the unalloyed state immediately upon its reduction from the raw materials has the most energetic effect from the standpoint of molecular scavenging and exerts the greatest influence on the grain size of the steel produced.

The most reactive condition of an element is its nascent state. If, therefore, vanadium can be produced in the bath in its nascent state and alloyed with the steel while retaining its nascent qualities, its action will be the most energetic. Its influence on the grain size of the steel produced will be of a different degree than that of the same amount of vanadium added to the same bath of steel in the form of a previously reduced alloy. The introduction of vanadium from unreduced raw materials, the reduction taking place directly in contact with the bath of steel, introduces the vanadium in this coveted state.

I may carry out my improved process by forming and refining a bath of molten steel in the usual steel making furnaces, such as the open-hearth or the electric furnace, the bath consisting of a layer of molten metal with a supernatant layer of molten slag. For the purpose of forming the slag layer, additional slag-forming materials, such as limestone, fluorspar, borax, etc. can be added so as to obtain the proper and desired characteristics of the slag. The unreduced vanadium compound is then introduced into the layer of slag and caused to evenly distribute and disseminate through it. A reducing agent such, for instance, as coke, is added on to the slag, whereby reduction of the vanadium takes place uniformly throughout the mass of the slag and the reduced vanadium enters into the body of the steel over its entire surface.

Other reducing agents, for example, carbonaceous reducing agents such as iron carbide, calcium carbide, etc., can be used.

The vanadium which is produced in the nascent state and has its nascent qualities protected by the slag immediately enters the steel layer with which it alloys.

As the reduction of the vanadium is effected in a slag layer in which the unreduced vanadium compound is evenly dissolved and reduced therein, the vanadium upon reduction is evenly disseminated in the form of molten globules throughout the entire body of the slag from which it descends uniformly over the entire surface of the metal layer. This slag layer, therefore, functions as a distributor of the freshly reduced vanadium, thus preventing its segregation in the steel. The reduction of the vanadium by the carbide formed and present in the slag has the further advantage of a cheap cost, the coke used in forming the carbide in the slag being procurable at an extremely low cost.

I may also carry out the process by separately incorporating the reducing agent into the metal layer and the unreduced vanadium compound into the slag layer of the steel bath, and then cause the reaction or reduction to proceed over the entire interface of contact between the metal layer and the slag layer by maintaining the proper temperature. In carrying out this process, a reducing agent or agents such as iron carbide, silicon metal, ferrosilicon, or silicon-containing alloys, can be incorporated in the metal layer. The reducing agent can be incorporated into the metal layer prior to the addition of the unreduced vanadium compound into the slag layer, or the unreduced vanadium compound can first be incorporated into the slag layer and the reducing agent thereafter charged into the metal layer through the slag layer, if it is of sufficient gravity to sink through the slag layer into the metal layer.

Metallic reducing agents such as aluminum, magnesium and the like, and their alloys or compounds, or a mixture of a metal and a metalloid, can be advantageously used in the process. The reducing agent can also be introduced with the cold scrap during the process of melting down the steel. The carbon content of the scrap melted down may also serve as the reducing agent. It is sometimes desirable to introduce only part of the vanadium content of the finished steel from unreduced vanadium compound and the balance from a previously reduced alloy. In such a case a vanadium alloy, for instance a vanadium-silicon alloy, can be charged into the metal layer and the silicon content of such alloy can be used to reduce the additional vanadium content in the slag layer containing unreduced vanadium compounds disseminated therethrough.

In the above case, where the reduction reaction is allowed to take place at the interface of the slag and metal layers, the vanadium in its nascent state is alloyed with the steel and the slag layer acts as a distributor of the vanadium over the entire metal bath, thus preventing segregation. Also, it allows the interface reaction to proceed at a controllable and uniform rate and helps to absorb the products formed by the oxidation of the reducing agent. For instance, if silicon is incorporated in the metal layer as the reducing agent, its product of oxidation, silica, formed during the reduction of the vanadium, is absorbed and held in combination by the lime content of the slag. It can be readily seen from this that, by the proper chemical constitution of the slag, for instance, its basicity, the rate of oxidation of the silicon and consequent reduction of the vanadium can be controlled. Combined with this control through chemical composition, the temperature imparted to the bath may be used as control of the progress of the reduction reaction.

Owing to the possibility presented by the slag of completely absorbing the products of oxidation of the reducing agent, the finished steel obtained is thereby protected from contamination by the reducing agent to an extent greater than required by the usual specifications for steel.

As above described, one of the reacting substances, either the reducing agent or the unreduced vanadium compound, is preferably first incorporated in the bath and becomes thoroughly disseminated therein before the other reacting substance is added. This results in a more uniform distribution in the bath of the vanadium as it is reduced, and thus prevents segregation which would tend to occur if a mixture of the reducing agent and unreduced vanadium compound were charged locally onto the bath.

As unreduced vanadium compounds, I may use an oxide of vanadium, or a vanadate of the heavy metals, such as iron or manganese vanadate, or a vanadate of alkaline earth metals, such as calcium or barium vanadate or unreduced silicates, such as vanadium silicate, or double silicates, such as calcium vanadium silicate. These unreduced compounds can be charged into the slag layer mixed with fluxes, or can be added by themselves. If any vanadium is present in the scrap used in carrying out this process, it will have oxidized during the refining operation of the steel bath and passed into the slag as vanadium oxide, where it can be economically used as a part of the useful vanadium compound to be reduced.

I have previously pointed out that the influence of vanadium on the grain size of steel depends on the form in which vanadium is introduced into the steel. The method, therefore, of adding part of the vanadium content as a previously reduced vanadium alloy and part as vanadium obtained by reduction of unreduced vanadium compounds in the steel bath itself, affords a means of exercising control over the grain size qualities.

The above described process is applicable not only to the production of steels where vanadium is the only alloying element, but also to the production of steels where, besides vanadium, other alloying elements, such as nickel, chromium, tungsten, molybdenum, and the like are present. The addition of deoxidizing agents, such as ferromanganese, ferrosilicon, ferrotitanium, ferrozirconium, etc. has little, if any, influence on the carrying out of my process or on the special physical qualifications obtained in the finished steel by my process.

While the preferred methods of carrying out my process have been specifically described, it is to be understood that the invention is not limited to all of the described details, but may be otherwise embodied in the processes of making vanadium steels within the scope of the following claim.

I claim:
The process of making vanadium steel of controllable grain size, which comprises forming a molten bath of steel in which is incorporated a reducing agent and introducing vanadium into the bath partly in the form of a previously reduced vanadium alloy and partly in the form of an unreduced vanadium compound charged into the molten bath and reduced therein by the reducing agent present in the bath.

In testimony whereof I have hereunto set my hand.

BYRAMJI D. SAKLATWALLA.